(12) United States Patent
Dinan et al.

(10) Patent No.: US 8,311,573 B1
(45) Date of Patent: Nov. 13, 2012

(54) QUALITY OF SERVICE BASED DOWNLINK POWER ALLOCATION

(75) Inventors: Esmail Hejazi Dinan, Herndon, VA (US); Krishna D. Sitaram, Chantilly, VA (US); Jong-hak Jung, Herndon, VA (US); Swati Tiwari, Austin, TX (US); Hemanth Balaji Pawar, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 0 days.

(21) Appl. No.: 13/454,261

(22) Filed: Apr. 24, 2012

Related U.S. Application Data

(62) Division of application No. 12/509,130, filed on Jul. 24, 2009, now Pat. No. 8,185,146.

(51) Int. Cl.
*H04B 7/00* (2006.01)

(52) U.S. Cl. ............ 455/522; 455/68; 455/69; 455/135

(58) Field of Classification Search .................. 455/522, 455/67.11, 68–70, 115.3, 126, 127.1, 127.2, 455/135, 226.3, 277.2, 296; 370/318
See application file for complete search history.

(56) References Cited

U.S. PATENT DOCUMENTS

| | | | |
|---|---|---|---|
| 4,261,054 A * | 4/1981 | Scharla-Nielsen .......... | 455/13.4 |
| 6,628,924 B1 * | 9/2003 | Miyamoto ..................... | 455/69 |
| 6,697,375 B1 | 2/2004 | Ming | |
| 6,865,168 B1 | 3/2005 | Sekine | |
| 6,873,847 B2 * | 3/2005 | Shimono et al. ............. | 455/441 |
| 7,319,884 B2 | 1/2008 | Suzuka et al. | |
| 7,327,801 B2 * | 2/2008 | Harel et al. ................... | 375/267 |
| 7,437,127 B2 * | 10/2008 | Goren et al. ............... | 455/67.11 |
| 7,643,845 B2 * | 1/2010 | Okumura et al. ............. | 455/522 |
| 7,761,111 B2 | 7/2010 | Kuroda et al. | |
| 8,036,151 B2 | 10/2011 | Das et al. | |
| 2003/0100329 A1 | 5/2003 | Kwon et al. | |
| 2004/0192290 A1 * | 9/2004 | Muthuswamy et al. ...... | 455/425 |
| 2005/0054364 A1 | 3/2005 | Jokinen et al. | |
| 2005/0054366 A1 | 3/2005 | Chen et al. | |
| 2006/0099986 A1 | 5/2006 | Vaittinen et al. | |
| 2006/0270433 A1 | 11/2006 | Kelton et al. | |
| 2007/0149150 A1 | 6/2007 | Miyazaki | |
| 2007/0254596 A1 * | 11/2007 | Corson et al. ................... | 455/68 |
| 2007/0280148 A1 | 12/2007 | Ding et al. | |
| 2008/0009256 A1 * | 1/2008 | Anderson ..................... | 455/296 |
| 2008/0277406 A1 | 11/2008 | Jantsch | |

(Continued)

OTHER PUBLICATIONS

Notice of Allowance dated Jan. 25, 2012 in parent U.S. Appl. No. 12/509,130.

*Primary Examiner* — Dominic E Rego
(74) *Attorney, Agent, or Firm* — O'Brien Jones, PLLC

(57) ABSTRACT

A first wireless device associated with a first profile is communicated with using a first transmitted power. A second wireless device associated with a second profile is communicated with using a second transmitted power. A third transmitted power is determined. The third transmitted power is associated with the first wireless device receiving data using a target modulation and coding scheme. A maximum transmitted power is determined to be exceeded if the third transmitted power is used to communicate with the first wireless device. The second wireless device is communicated with using a fourth transmitted power. The fourth transmitted power allows the third transmitted power to be used to communicate with the first wireless device without exceeding the maximum transmitted power.

15 Claims, 6 Drawing Sheets

U.S. PATENT DOCUMENTS

| | | | |
|---|---|---|---|
| 2009/0010148 A1* | 1/2009 | Hara | 370/208 |
| 2009/0081972 A1 | 3/2009 | Rofougaran | |
| 2009/0219853 A1 | 9/2009 | Hart et al. | |
| 2009/0247084 A1 | 10/2009 | Palanki | |
| 2009/0325623 A1 | 12/2009 | Morita et al. | |
| 2010/0233975 A1 | 9/2010 | Wu et al. | |

* cited by examiner

QUALITY OF SERVICE BASED DOWNLINK POWER ALLOCATION

This application is a divisional of prior application Ser. No. 12/509,130, filed Jul. 24, 2009, which is hereby incorporated by reference in its entirety.

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Overview

A method of operating a communication system is disclosed. A first wireless device associated with a first profile is communicated with using a first transmitted power. A second wireless device associated with a second profile is communicated with using a second transmitted power. A third transmitted power is determined. The third transmitted power is associated with the first wireless device receiving data using a target modulation and coding scheme. A maximum transmitted power is determined to be exceeded if the third transmitted power is used to communicate with the first wireless device. The second wireless device is communicated with using a fourth transmitted power. The fourth transmitted power allows the third transmitted power to be used to communicate with the first wireless device without exceeding the maximum transmitted power.

A method of operating a communication system is disclosed. Wireless communication is sent to a first plurality of wireless devices. The first plurality of wireless devices is associated with a first quality of service. Wireless communication is sent to second plurality of wireless devices. The second plurality of wireless devices is associated with a second quality of service. A first total transmit power associated with the first plurality of wireless devices needed to send wireless communication to the first plurality of wireless devices using a target modulation and coding scheme is determined. Based on the first total transmit power, wireless communication is sent to the second plurality of wireless devices using reduced transmit power.

A communication system is disclosed. A wireless station communicates with a first plurality of wireless devices associated with a first quality of service. The wireless station communicates with a second plurality of wireless devices associated with a second quality of service. A control system instructs the wireless station to increase a first transmit power level for at least one of the first plurality of wireless devices and decrease a second transmit power level for at least one of the second plurality of wireless devices in response to determining the at least one of the first plurality of wireless devices is not receiving communication using at least a minimum target modulation and coding scheme.

DETAILED DESCRIPTION

In an embodiment, the wireless devices receiving data from a base station via the downlink channel are grouped and sorted according to their quality of service (QoS) class. Starting with the highest quality of service class, the base station calculates the additional amount of power each wireless device needs in order to receive data at a target modulation and coding scheme. If the aggregate amount of additional power required for each of the devices will cause the base station to exceed its maximum transmit power, the base station reduces the power to the devices in a lower quality of service class. By reducing the power used to transmit to devices of a lower quality service class, more power is available for devices of a higher quality of service class. This additional power may be allocated to the devices in the higher quality of service class so that they may communicate using the target modulation encoding scheme.

Figure 1:
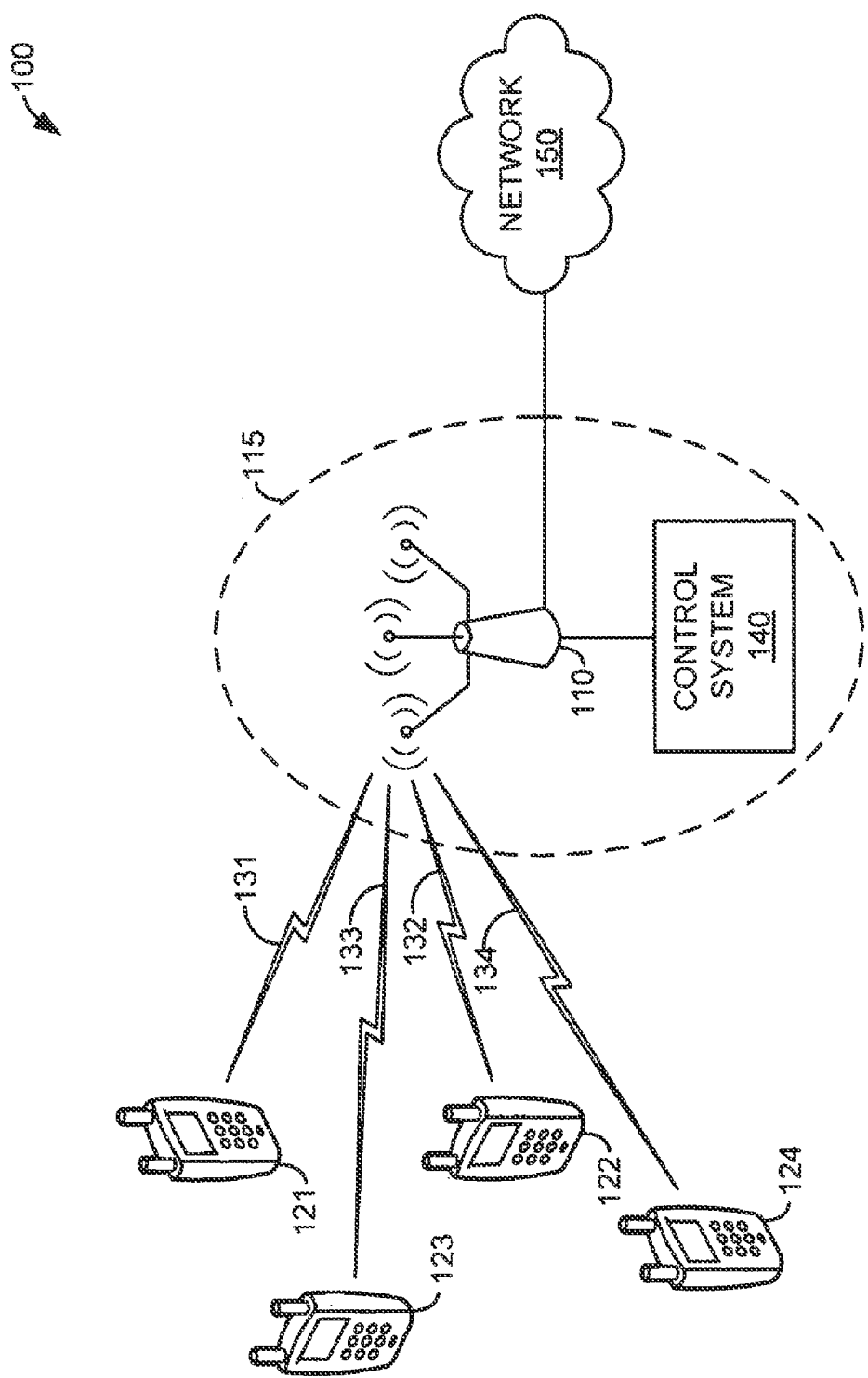
FIG. 1 is a block diagram illustrating a communication system.

FIG. 1 is a block diagram illustrating a communication system. In FIG. 1, communication system 100 comprises base station 110, wireless device 121, wireless device 122, wireless device 123, wireless device 124, control system 140, and network 150. Base station 110 is operatively coupled to network 150. Base station 110 is operatively coupled to control system 140. Wireless devices 121-124 are operatively coupled to base station 110 via wireless links 131-134, respectively. Thus, wireless devices 121-124 may be operatively coupled to network 150 via base station 110.

In an embodiment, control system 140 and base station 110 may comprise a wireless station 115. In FIG. 1, control system 140 is shown separate from base station 110. However, this is for illustration purposes only. It should be understood that control system 140 may be integrated into base station 110.

Base station 110 includes multiple antennas and multiple transmitters. Base station 110 may include multiple receivers. Wireless devices 121-124 may include multiple antennas, multiple receivers, and multiple transmitters.

Wireless devices 121-124 may be any device, system, combination of devices, or other such communication platform capable of communicating with base station 110. Wireless devices 121-124 may use multiple antennas to communicate with base station 110. Wireless devices 121-124 may use communication aspects specified by the WiMAX specification including, but not limited to, the modulation and coding schemes (MCSs), and the multiple-input multiple-output (MIMO) modes, detailed therein. Wireless devices 121-124 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 110 via multiple antennas. Other types of communication platforms are possible.

Wireless devices 121-124 may establish communication sessions with base station 110 in order to receive communication services from network 150. These services may include voice services and data services. These services may include, but are not limited to, telephone services, long distance services, mobile voice services, mobile data services, push-to-talk services, internet services, web browsing, email, pictures, picture messaging, video, video messaging, audio, voicemail, music, MP3's, ring tones, stock tickers, news alerts, and so on.

To receive one or more of these services, traffic flows may be exchanged by wireless devices 121-124 and base station 110. These traffic flows may have one or more service flow classifications. For example, base station 110 may exchange traffic flows with wireless device 121 that includes a service traffic flow classification for voice service, and a service traffic flow classification for a web browsing service. The service traffic flow classifications for voice service and for web browsing service may have different quality of service (QoS) requirements. In an embodiment, the traffic flows for these services have different service flow classifications.

In an embodiment, the service flow classifications may include wireless traffic classifications. For example, for WiMAX wireless communication there are wireless traffic quality of service classifications that include: unsolicited grant service (UGS), real time polling service (rtPS), extended real time polling service (ertPS), non-real time polling service (nRTPS), and best effort (BE).

Base station 110 may be any wireless system that provides the air interface to wireless devices 121-124. Base station 110 may provide one or more of the air interfaces to wireless devices 121-124 using multiple antennas. Base station 110 may use one or more transmitters. Base station 110 may use one or more receivers. Base station 110 may be any wireless system that can provide an air interface to wireless devices 121-124 using multiple antennas. Base station 110 may use communication aspects specified by the WiMAX specification including, but not limited to, the MCSs and MIMO modes detailed therein. Examples of base stations that may be utilized include, base transceiver stations (BTSs), radio base stations (RBSs), Node B, enhanced Node B (eNBs) and others. Base station 110 may include a number of elements known to those skilled in the art comprising transceivers, power amplifiers, combiner, duplexer, and antennas. Base station 110 may include additional components such as a control function, control computer, and/or control system 140. However, these additional components have been omitted from FIG. 1 for the sake of brevity.

Network 150 may be any network or collection of networks that couple, link, or otherwise operatively connect base station 110 with other devices or systems. Network 150 may include other secondary data networks. In an example, network 150 may include a backhaul network, a local network, a long distance network, a packet network, the internet, or any combination thereof, as well as other types of networks.

In an example, network 150 may be, or include all or parts of an IEEE 802.16 (WiMAX) specified system. These parts may include additional base stations (BSs), an access services network (ASN), access services network gateway (ASN-GW), or connectivity service network (CSN).

In an embodiment, wireless devices 121-124 may receive data transmitted by base station 110 using one of several modulation and coding schemes. The modulation and coding scheme being used by a particular one of wireless device 121-124 may be different from the modulation and coding schemes being used by the other wireless devices 121-124.

In an embodiment, the modulation coding scheme parameters that base station 110 may transmit to wireless device 121-124 are modulation types that include quadrature phase shift keying (QPSK) and quadrature amplitude modulation (QAM). In an embodiment, base station 110 may transmit to wireless devices 121-124 using one of a set of modulation coding scheme parameters specified by the WiMAX specifications. In an embodiment, the set of modulation coding schemes may include one or more of: QPSK 1/2; QPSK 3/4; 16QAM 1/2; 16QAM 3/4; 64QAM 1/2; 64QAM 2/3; 64QAM 3/4; and 64QAM 5/6.

The modulation and coding scheme selected by base station 110 for a particular wireless device 121-1124 may depend on an indicator of signal strength. This indicator may be associated with the signal strength received by the particular wireless device 121-124. An indicator of the received signal strength may be provided to base station 110 by the particular wireless device 121-124. A wireless standard may specify the ability to send signal quality information from a wireless device 121-124 to base station 110. For example, WiMAX specifies a channel quality indicator channel (CQICH) that may be used to provide air interface condition information in an uplink slot to base station 110. The air interface condition information may include or be based on an indicator of a signal to interference and noise ration (SINR) or an indicator of a carrier to interference and noise ratio (CINR). The CQICH may be comprised of multiple slots thereby allowing multiple wireless devices to provide signal quality information to base station 110 each frame.

In an embodiment, wireless devices 121-124 may be operated in M by N multiple-input multiple-output (MIMO) modes. M is the number of transmitters and/or antennas that base station 110 is using to transmit a data stream to a given wireless device 121-124. N is the number of receivers and/or antennas that a given wireless device 121-124 is using to receive a data stream from base station 110. In an embodiment, M and N may both be two (2). Thus, a given wireless devices 121-124 would be said to be operating in 2×2 MIMO mode. In another embodiment, M=1 and N=2. Thus, a given wireless device would be said to be operating in 1×2 MIMO mode.

In addition to MIMO modes that specify the number of transmitting and receiving antennas, there are MIMO modes that specify how the data stream is transmitted from the multiple transmitting antennas. A first MIMO mode splits a data stream into multiple lower rate data streams and each data stream is transmitted from a different transmit antenna of base station 110 in the same frequency channel. This mode may be referred to as spatial-multiplexing MIMO (SM-MIMO).

A second MIMO mode transmits multiple redundant copies of a single data stream. The single stream is coded using techniques called space-time coding. The single stream is emitted from each of the transmit antennas of base station 110 using certain principles of full or near orthogonal coding. This mode may be referred to as diversity coding MIMO or space-time coding MIMO (STC-MIMO). In a WiMAX specified system, STC-MIMO may be known as MIMO-A. SM-MIMO may be known as MIMO-B. STC-MIMO, SM-MIMO, along with other multi-antenna techniques where M>1 and N>=1 may be referred to collectively as multi-antenna modes.

Wireless devices 121-122 may be associated with a first profile. Wireless devices 123-124 may be associated with a second profile. For example, wireless devices 121 and 122 may be associated with a higher subscriber quality of service profile than wireless devices 123-124. In other words, communication system 100 may associate wireless devices 121 and 122 with a subscriber profile (e.g., "gold") that is designed to differentiate wireless devices 121 and 122 from wireless devices 122 and 124 which are associated with a lower quality of service subscriber profile (e.g., "silver" or "bronze").

In another example, wireless devices 121 and 122 may be associated with a higher service flow quality of service profile than wireless devices 123 and 124. In other words, service flow classifications (e.g., UGS or rtPS) that have higher priority may be associated with wireless devices 121 and 122 than service flow classifications associated with wireless devices 121 and 122 (e.g., nRTPS or BE). Based on the aforementioned profiles, communication system 100 or control system 140 may undertake efforts to improve the quality of service provided to wireless devices associated with higher quality of service profiles (e.g., wireless devices 121 and 122) at the expense of wireless devices associated with lower quality of service profiles (e.g., wireless devices 123 and 124).

In an embodiment, communication system 100 or control system 140 may group wireless devices 121-124 according to their associated profile. For example, because wireless devices 121 and 122 are associated with a first profile, they would be placed in a first group. Because wireless devices 123 and 124 are associated with a second profile, they would be placed in a second group. These groups may then be ordered by priority. In other words, if the first profile had a higher priority than the second profile, then the first group may be selected before the second group for an increase in transmit power in order to use a target modulation and coding scheme and/or multi-antenna mode. Likewise, the second group may be selected before the first group for a decrease in transmit power in order to make power available for the first group to use a target modulation and coding scheme and/or multi-antenna mode.

The amount of additional transmit power each wireless device 121-122 in the first group needs to be able to use a target modulation and coding scheme and/or multi-antenna mode may be based on a signal quality indicator. In an embodiment, a signal quality indicator may be based on a received signal strength indication (RSSI). In an embodiment, the signal quality indicator may be based on a carrier to interference and noise ratio (CINR).

In an embodiment, the signal quality indicator associated with a wireless device 121-124 may be based on an RSSI indicator, CINR indicator, and/or channel quality indicator (CQI) received from the wireless devices 121-124. The RSSI indicator, CINR indicator, and/or CQI received from a wireless device 121-124 may be used in a calculation of the amount of additional (or total) transmit power needed to result in a target modulation and coding scheme for that wireless device 121-124. In another embodiment, a current modulation and coding scheme associated that the wireless device 121-124 may be used in a calculation of the amount of additional (or total) transmit power needed to result is a target modulation and coding scheme for that wireless device 121-124. Table 1 illustrates the results of an example calculation of the transmit power needed to result in a target modulation and coding scheme for all wireless devices 121-124.

TABLE 1

| Wireless device (profile) | Current sub-channel power (mW) | Number of sub-channels allocated to device | Total transmit power allocated to device (mW) | Current MCS | Total power needed for target MCS (e.g., 64 QAM 5/6) | Change in power (mW) |
|---|---|---|---|---|---|---|
| 121 (gold) | 500 | 6 | 3000 | 16 QAM 3/4 | 4500 | 1500 |
| 122 (gold) | 500 | 5 | 2500 | 64 QAM 3/4 | 3000 | 500 |
| 123 (silver) | 500 | 5 | 2500 | QPSK 1/2 | 4300 | 1800 |
| 124 (silver) | 500 | 7 | 3500 | 64 QAM 3/4 | 3700 | 200 |
| | | | | Total: | 15500 | 4000 |

In an embodiment, control system 140 may select a first group of wireless devices associated with a first quality of service profile (e.g., wireless devices 121 and 122) for a power increase to achieve a target modulation and coding scheme. This selection may be based on a determination that at least one of the first group of wireless devices is not receiving communication using at least the target modulation and coding scheme. For example, referring to Table 1, control system 140 may select the first group of wireless devices (e.g., the "gold" profile group) because wireless device 121 is using 16QAM 3/4 and the target MCS is 64QAM 5/6.

Control system 140 may determine whether increasing the power the needed amounts to the first group will cause base station 110 to exceed a maximum transmitted power. If base station 110 is already transmitting with a total power that is within the needed amount of its maximum allowed transmit power, then increasing the total transmit power to the first group by the needed amount would exceed this maximum allowed transmit power. In this case, control system 140 may select a select a second group of wireless devices associated with a second quality of service profile (e.g., wireless devices 123 and 124) for a power decrease.

Using Table 1 as an example, assume a maximum total transmit power that is 12000 mW. From Table 1, the total current transmit power is 11500 mW. Also from Table 1, a total of 1500+500=2000 mW of additional transmit power will be needed to allow wireless device 121 and 122 to use the target MCS. Thus, increasing the transmit power to wireless devices in the "gold" profile will exceed the maximum allowed total transmit power by 1500 MW. Thus, control system 140 may select the second group of wireless devices (e.g., "silver") for a power decrease. Control system 140 may select the second group because they have a lower (or lowest) priority profile.

Control system 140 may decrease the total power to the second group of wireless devices by an amount sufficient to allow the first group of wireless devices to use the target modulation and coding scheme. Using Table 1 as an example, because increasing the transmit power to the "gold" profile wireless devices would exceed the maximum allowed total transmit power by 1500 mW, control system 140 may decrease the total power allocated to the second group of wireless devices by at least 1500 mW. Control system 140 may decrease the total power allocated to each of the second group of wireless devices by an equal amount. In this case, control system 140 would decrease the power allocated to wireless devices 123 and 124 by 750 mW (e.g., 1500 mW/(# of devices in silver group)=−1500/2=750 mW). Table 2 illustrates a power allocation and possible MCS's resulting from this example.

TABLE 2

| Wireless device (profile) | Total transmit power allocated to device (mW) | New MCS |
|---|---|---|
| 121 (gold) | 4500 | 64QAM 5/6 |
| 122 (gold) | 3000 | 64QAM 5/6 |
| 123 (silver) | 1750 | QPSK 1/8 |
| 124 (silver) | 2750 | QPSK 1/4 |
| Total: | 12000 | |

Figure 2:
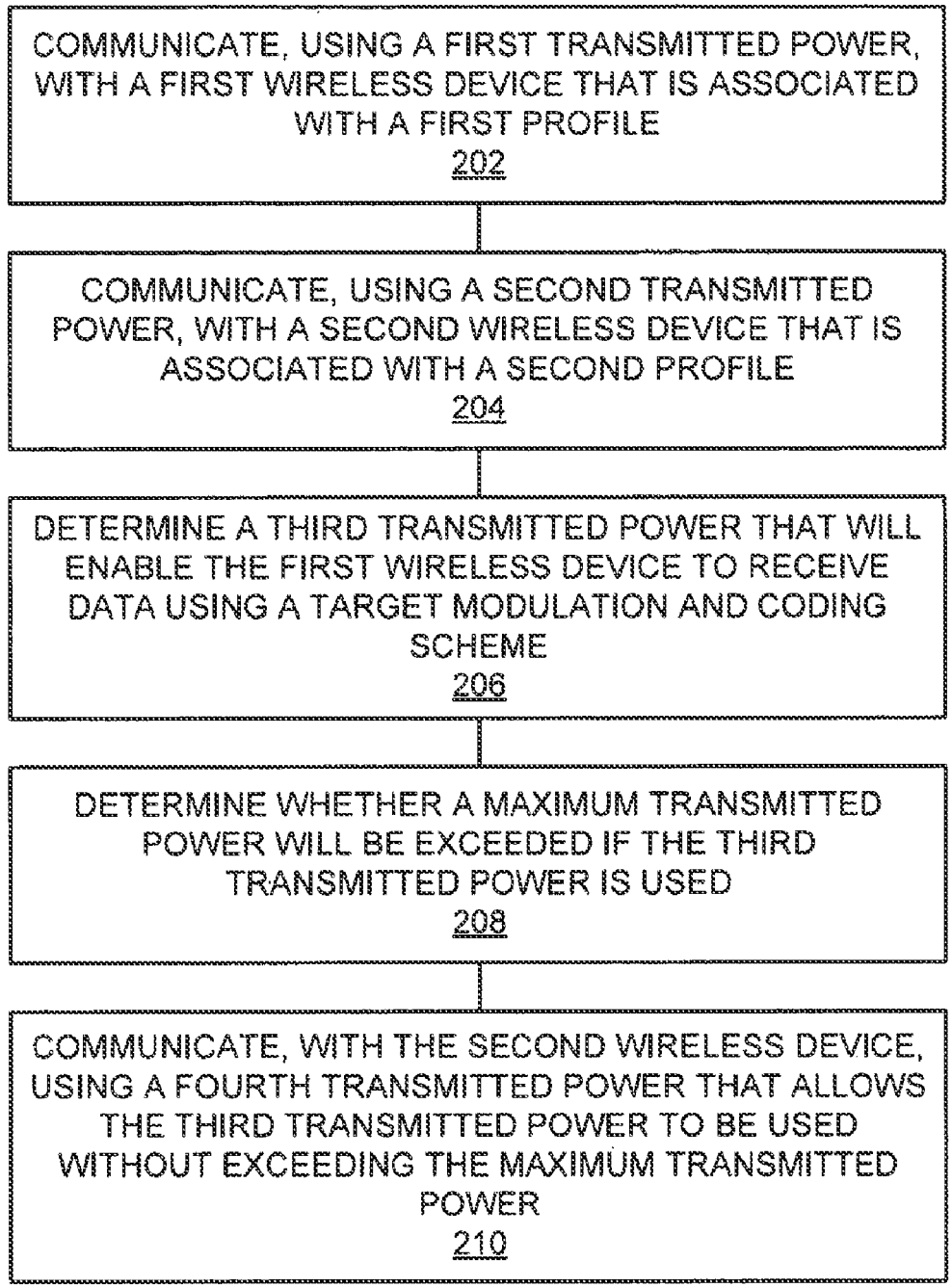
FIG. 2 is a flowchart illustrating a method of operating a communication system.

FIG. 2 is a flowchart illustrating a method of operating a communication system. The steps illustrated in FIG. 2 may be performed by one or more elements of communication system 100 or wireless station 115.

A first wireless device that is associated with a first profile is communicated with using a first transmitted power (202). For example, wireless station 115 may send data to wireless device 121 using a first transmitted power. Wireless device 121 may be associated with a first QoS profile. A second wireless device that is associated with a second QoS profile is communicated with using a second transmitted power (204). For example, wireless station 115 may send data to wireless device 123 using a second transmitted power. Wireless device 123 may be associated with a second quality of service profile. This second quality of service profile may be lower than the first quality of service profile.

A third transmitted power that will enable the first wireless device to receive data using a target modulation and coding scheme is determined (206). For example, wireless station 115 may determine a transmitted power that will enable wireless device 121 to receive data at or above a target modulation and coding scheme. Wireless station 115 may determine a transmitted power that will enable wireless device 121 to receive data using a target multi-antenna mode. For example, if wireless device 121 is operating using 16 QAM 1/2 and space-time coding, wireless station 115 may determine that an increase of 1500 MW will allow wireless device 121 to receive data using 64 QAM 5/6 and spatial multiplexing. If wireless device 121 was allocated six subchannels, wireless station 115 may determine to accomplish this 1500 mW increase by increasing the power on each of those subchannels allocated to wireless device 121 by 250 mW (6×250=1500 mW).

It is determined whether a maximum transmitted power will be exceeded if the third transmitted power is used (208). For example, wireless station 115 may determine that increasing the power to wireless device 121 by 1500 mW will result in wireless station 115 exceeding a maximum transmit power limit. Wireless station 115 may determine that increasing the power to one or more subchannels allocated to wireless device 121 by 250 mW will exceed a subchannel transmit power limit.

The second wireless device is communicated with using a fourth transmitted power that allows the third transmitted power to be used without exceeding the maximum transmitted power (210). For example, wireless station 115 may communicate with wireless device 124 using a reduced transmit power. This reduced transmit power allows an increased transmit power to be used to communicate with wireless device 121. To further illustrate, assume the maximum total transmitted power wireless station 115 is allowed to use is 12000 mW. Also assume that wireless station 115 is already transmitting at a total transmitted power of 11000 mW. Thus, in order to transmit to wireless device 121 using an additional 1500 mW of total power required to achieve a target modulation and coding scheme, wireless station 115 would reduce the power used to transmit to wireless device 124 by 500 mW.

Once the transmit power to wireless device 124 is reduced, wireless station 115 may communicate with wireless device 121 using the increased (e.g., third) transmit power. This increased transmit power may result in wireless device 121 switching to receiving data using the target modulation and coding scheme. This increased transmit power may also result in wireless device 121 switching to receiving data using a target multi-antenna mode.

Figure 3:
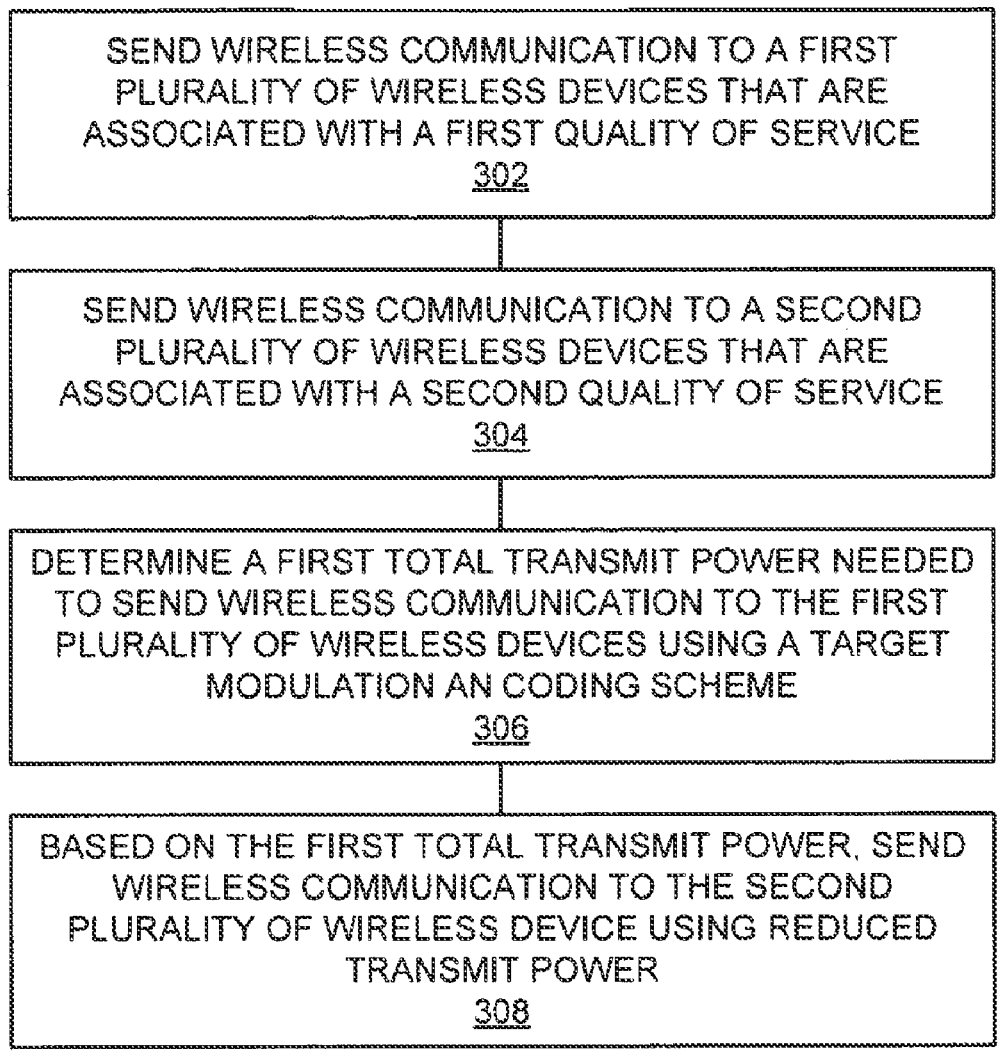
FIG. 3 is a flowchart illustrating a method of operating a communication system.

FIG. 3 is a flowchart illustrating a method of operating a communication system. The steps illustrated in FIG. 3 may be performed by one or more elements of communication system 100 or wireless station 115.

Wireless communication is sent to a first plurality of wireless devices that are associated with a first quality of service (302). For example, base station 110 may send communication to wireless device 121 and wireless device 122. Wireless devices 121 and 122 may be associated with a first quality of service profile. For example, wireless devices 121 and 122 may be associated with a "gold" quality of service profile. Wireless devices 121 and 122 may be associated with a high priority service flow classification such as unsolicited grant service.

Wireless communication is sent to a second plurality of wireless devices that are associated with a second quality of service (304). For example, base station 110 may send communication to wireless device 123 and wireless device 124. Wireless devices 123 and 124 may be associated with a second quality of service profile. For example, wireless devices 123 and 124 may be associated with a "bronze" quality of service profile. Wireless devices 123 and 124 may be associated with a low priority service flow classification such as best effort.

A first total transmit power needed to send wireless communication to the first plurality of wireless devices using a target modulation and coding scheme is determined (306). For example, control system 140 may determine a total transmit power required to cause a wireless device 121 and 122 to change from their current modulation and coding scheme to a target modulation and coding scheme. To illustrate, assume wireless device 121 is operating using QPSK 3/4, and wireless device 122 is operating using 16 QAM 3/4, and the target modulation and coding scheme for the first quality of service is 64 QAM 2/3. Control system 140 may determine a total transmit power to be divided between wireless devices 121 and 122 that will result in both wireless devices 121 and 122 communicating using the target modulation and coding scheme of 64 QAM 2/3.

Based on the first total transmit power, wireless communication is sent to the second plurality of wireless devices using reduced transmit power (308). For example, if the first total transmit power determined in block 306 would result in a maximum transmit power being exceeded, control system 140 may determine a reduced transmit power for one or more of wireless device 123 and 124, Control system 140 may instruct base station 110 to use the reduced transmit powers to communicate with wireless devices 123 and 124.

Once the power is reduced to wireless devices 123 and 124, base station 110 may be instructed to communicate with wireless devices 121 and 122 using an increased transmit power. This increased transmit power may result in one or more of wireless devices 121 and 122 switching to receiving data using the target modulation and coding scheme. This increased transmit power may also result in one or more of wireless devices 121 and 122 switching to receiving data using a target multi-antenna mode.

Figure 4:
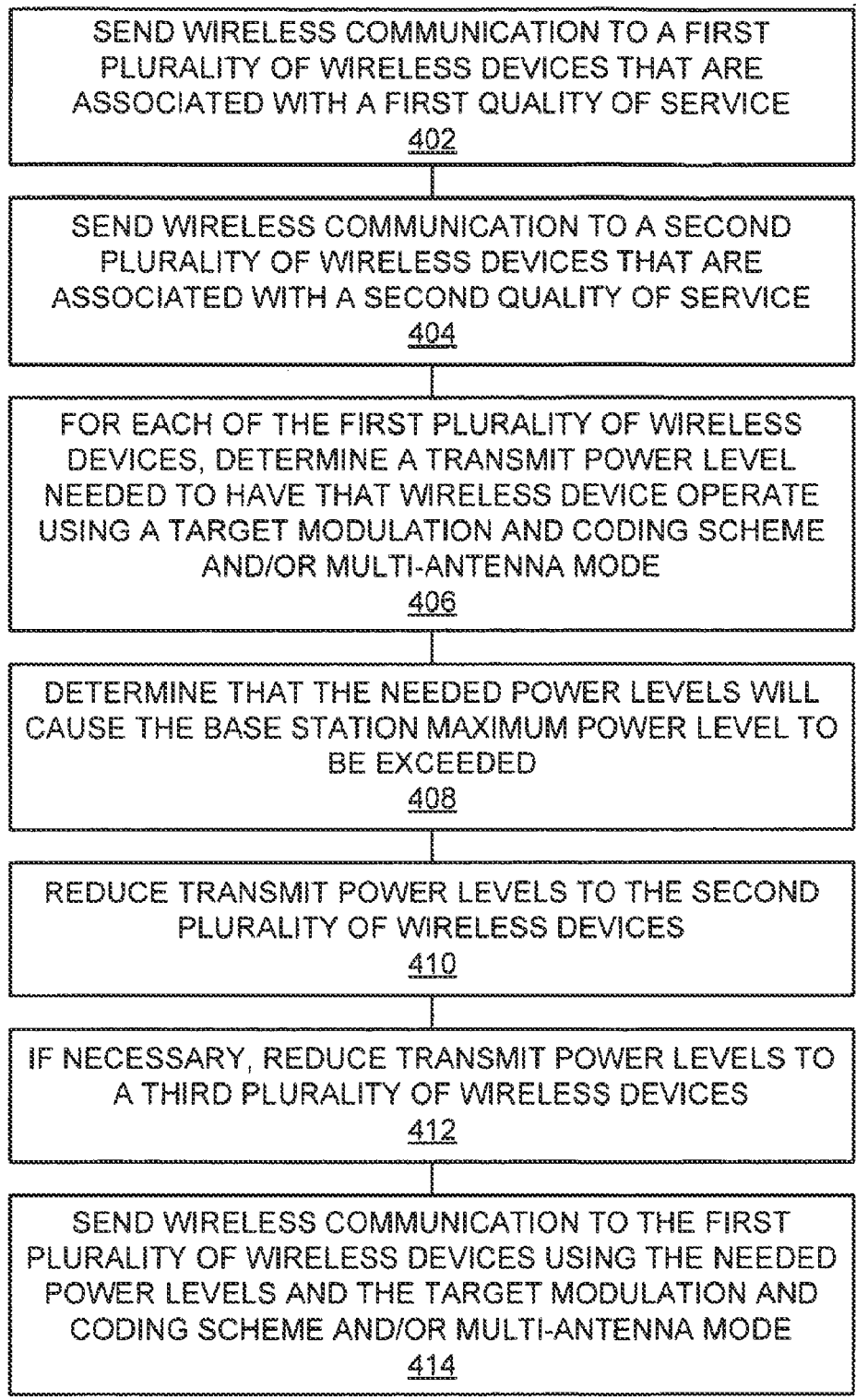
FIG. 4 is a flowchart illustrating a method of controlling a communication system.

FIG. 4 is a flowchart illustrating a method of controlling a communication system. The steps illustrated in FIG. 4, for example, may be performed by control system 140 and/or one or more elements of communication system.

Wireless communication is sent to a first plurality of wireless devices that are associated with a first quality of service (402). For example, wireless data communication may be sent to wireless devices 121 and 122, Wireless devices 121 and 122 may be associated with a high priority quality of service profile. Wireless devices 121 and 122 may be associated with a high priority service flow.

Wireless communication is sent to a second plurality of wireless devices that are associated with a second quality of service (404). For example, wireless data communication may be sent to wireless devices 123 and 124. Wireless devices 123 and 124 may be associated with a quality of service profile that is lower that the quality of service profile associated with wireless device 121 and 122. Wireless devices 123 and 124 may be associated with a low priority service flow.

For each of the first plurality of wireless devices, a transmit power level needed to have that wireless device operate using a target modulation and coding scheme and/or multi-antenna mode is determined (406). For example, for each of wireless devices 121 and 122, a transmit power level, or increase in transmit power level, required for these devices to operate at or above a certain target modulation and coding scheme and/or multi-antenna mode may be determined.

The needed power levels are determined to cause the base station to exceed a maximum power level (408). For example, the increases in transmit power levels to wireless devices 121 and 122 may be determined to cause base station 110 to exceed its maximum transmit power level.

Transmit power levels to the second plurality of wireless devices are reduced (410). For example, base station 110 may be instructed to reduce the transmit power levels used to communicate data to wireless devices 123 in 124. The amount of reduction in transmit power levels to wireless devices 123 and 124 may be chosen to correspond to at least the amount that base station 110 needs in order to transmit the increased power levels determined in block 406 without exceeding the maximum power level allowed.

If necessary, reduce transmit power levels to a third plurality of wireless devices (412). For example, if reducing power levels to wireless devices 123 in 124 is not enough to allow the station 110 to transmit using the increased power levels determined in block 406, base station 110 may reduce transmit power levels used to communicate data to other wireless devices (not shown).

Wireless communication is sent to the first plurality of wireless devices using the needed power levels, and the target modulation and coding scheme and/or multi-antenna mode (414). For example, base station 110 may send data to wireless devices 121 and 122 using the power levels calculated in block 406. This may result in wireless devices 121 and 122 utilizing the target modulation and coding scheme and/or multi-antenna mode.

Figure 5:
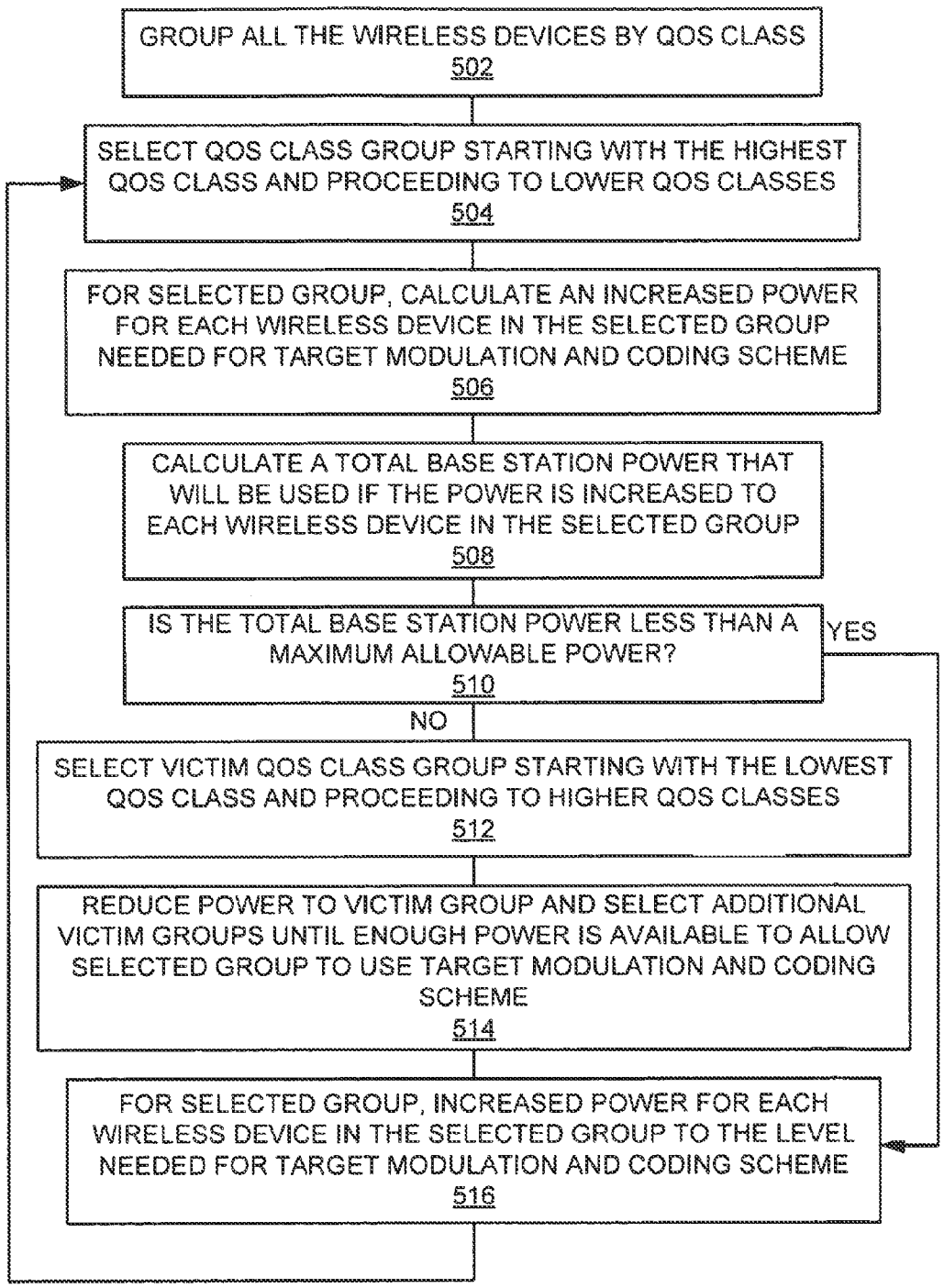
FIG. 5 is a flowchart illustrating a quality of service based power control method.

FIG. 5 is a flowchart illustrating a quality of service based power control method. The steps illustrated in FIG. 5 may be performed by one or more elements of communication system 100 or wireless station 115.

All of the wireless devices are grouped by quality of service (QoS) class (502). For example, control system 140 may group wireless devices 121-124 by a set of profiles associated with wireless devices 121-124. In an example, control system 140 may place wireless devices 121 and 122 into a first group because they are associated with a high priority QoS class (e.g., gold), Control system 140 may place wireless devices 123 and 124 into a second group because they are associated with a lower priority QoS class (e.g., bronze).

A QoS class group is selected starting with the highest QoS class and proceeding to the lower QoS classes (504). For example, control system 140 may select the first QoS class group because it is associated with the highest QoS class. After that, control system 140 may select a second QoS class group because it is associated with the next highest QoS class.

For the selected group, calculate an increased power for each wireless device in the selected group that is needed for a target modulation and coding scheme (506). For example, for each of wireless devices 121 and 122 control system 140 may calculate a first increased power and a second increased power needed to communicate data to wireless devices 121 and 122, respectively, using a target modulation and coding scheme.

A total base station power that will be used if the power is increased each wireless device in the selected group is calculated (508). For example, control system 140 may calculate the total power that base station 110 will be using if the power used to transmit to wireless devices 121 and 122 is increased to the first increased power and the second increased power, respectively.

Whether the total base station power is less than a maximum allowable power is determined. If the total base station power is less than a maximum allowable power, flow proceeds to block 516. If the total base station power is more than the maximum allowable power, flow proceeds to block 512 (510). A victim QoS class group is selected starting with the lowest QoS class and proceeding to higher QoS classes (512). For example, the second QoS class group (e.g., bronze—wireless devices 123 and 124) may be selected as the victim QoS class group because it is associated with the lowest QoS class.

Power is reduced to the victim group and additional victim groups are selected until enough power is available to allow the selected group to use the target modulation and coding scheme (514). For example, power may be reduced to the second QoS class group and/or additional QoS class groups until enough power is available to allow the wireless devices in first QoS class group (e.g., wireless device 121 and 122) to use the target modulation and coding scheme.

For the selected group, the power is increased for each wireless device in the selected group to at least the level needed to use the target modulation and coding scheme (516).

For example, power may be increased to each of wireless devices 121 and 122 to the levels needed to use the target modulation and coding scheme.

Figure 6:
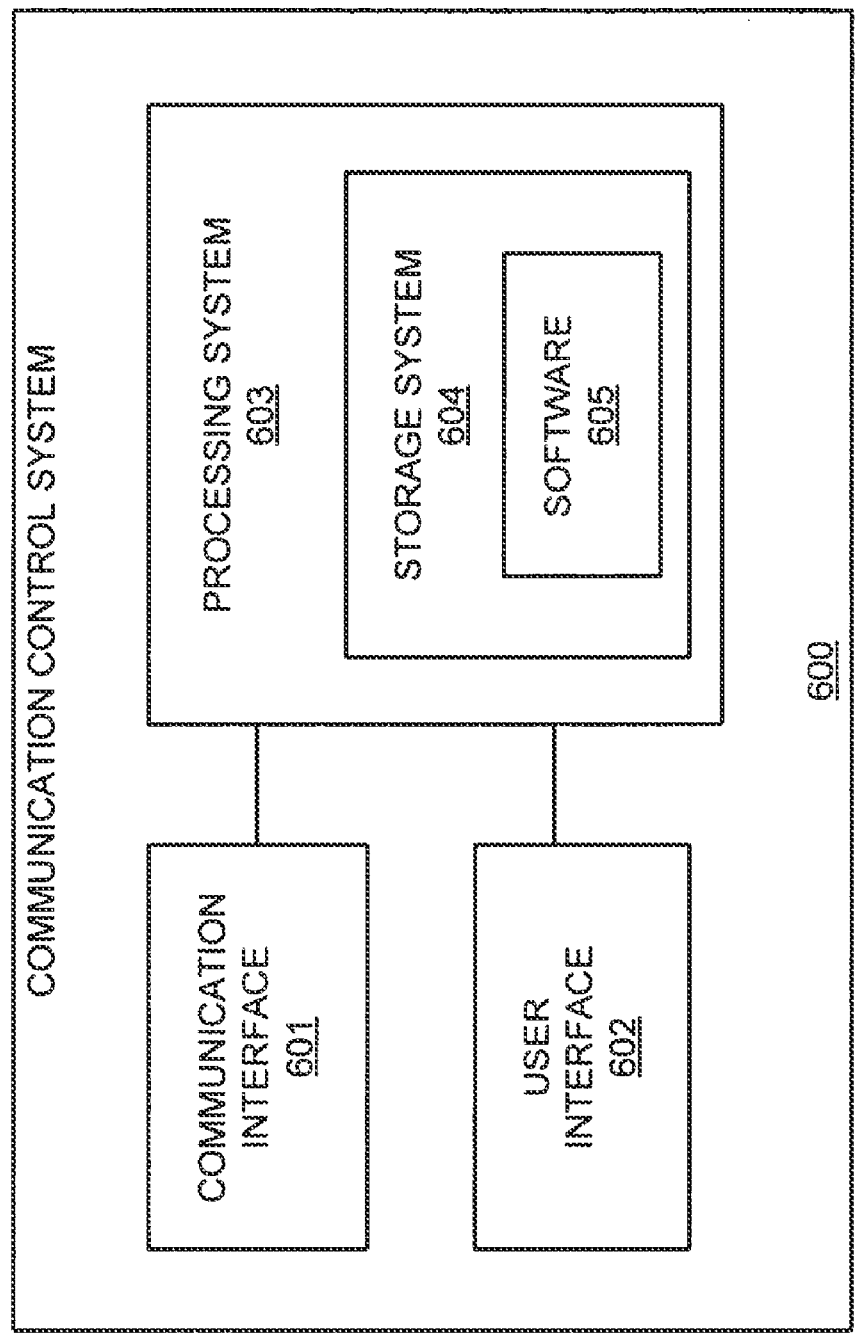
FIG. 6 is a block diagram of a communication control system.

FIG. 6 illustrates communication control system 600. Communication control system 600 may be an example of one or more components of wireless station 115, although wireless station 115 may use alternative configurations. Communication control system 600 comprises communication interface 601, user interface 602, and processing system 603. Processing system 603 is linked to communication interface 601 and user interface 602. Processing system 603 includes storage system 604 that stores software 605.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing system 603 may comprise a microprocessor and other circuitry that retrieves and executes software 605 from storage system 604. Storage system 604 may comprise a disk drive, flash drive, data storage circuitry, or some other memory apparatus. Software 605 comprises computer programs, firmware, or some other form of machine-readable processing instructions. Software 605 may include an operating system, utilities, drivers, network interfaces, applications, or some other type of software. When executed by processing system 603, software 605 directs processing system 603 to operate communication control system 600 as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A communication system, comprising:
a wireless station that communicates with a first plurality of wireless devices associated with a first quality of service, and with a second plurality of wireless devices associated with a second quality of service; and,
a control system instructing the wireless station to increase a first transmit power level for at least one of the first plurality of wireless devices and decrease a second transmit power level for at least one of the second plurality of wireless devices in response to determining the at least one of the first plurality of wireless devices is not receiving communication using at least a minimum target modulation and coding scheme.

2. The communication system of claim 1, wherein the first quality of service is associated with a first service flow classification.

3. The communication system of claim 1, wherein the second transmit power level is decreased based on the increased the first transmit power level.

4. The communication system of claim 1, wherein the second transmit power level is decreased based on whether the increased the first transmit power level will cause the wireless station to exceed a maximum transmit power.

5. The communication system of claim 1, wherein the communication system increases the first transmit power level for the at least one of the first plurality of wireless devices based on a target multi-antenna mode associated with the first plurality of wireless devices.

6. A method of operating a communication system, the method comprising:
sending wireless communication to a first plurality of wireless devices associated with a first quality of service;
sending wireless communication to a second plurality of wireless devices associated with a second plurality of wireless devices associated with a second quality of service;
increasing a first transmit power level for at least one of the first plurality of wireless devices in response to a determination that the at least one of the first plurality of wireless devices is not receiving communication using at least a minimum target modulation and coding scheme; and
decreasing a second transmit power level for at least one of the second plurality of wireless devices in response to the determination that the at least one of the first plurality of wireless devices is not receiving communication using at least the minimum target modulation and coding scheme.

7. The method of claim 6, wherein the first quality of service is associated with a first service flow classification.

8. The method of claim 6, wherein the decreasing the second transmit power level is based on the increasing the first transmit power level.

9. The method of claim 6, wherein the decreasing the second transmit power level is based on whether the increased first transmit power level will cause the wireless station to exceed a maximum transmit power.

10. The method of claim 6, wherein the increasing the first transmit power level is based on a target multi-antenna mode associated with the first plurality of wireless devices.

11. A method of operating a communication system, the method comprising:
determining that at least one of a first plurality of wireless devices associated with a first quality of service is not receiving communication using at least a minimum target modulation and coding scheme;
instructing a wireless station to increase a first transmit power level for at least one of the first plurality of wireless devices in response to the determination that at least one of the first plurality of wireless devices associated with the first quality of service is not receiving communication using at least the minimum target modulation and coding scheme; and
instructing the wireless station to decrease a second transmit power level for at least one of a second plurality of wireless devices associated with a second quality of service in response to the determination that at least one of the first plurality of wireless devices associated with the first quality of service is not receiving communication using at least the minimum target modulation and coding scheme.

12. The method of claim 11, wherein the first quality of service is associated with a first service flow classification.

13. The method of claim 11, wherein the instructing the wireless device to decrease the second transmit power level is based on the increased first transmit power level.

14. The method of claim 11, wherein the instructing the wireless device to decrease the second transmit power level is based on whether the increased first transmit power level will cause the wireless station to exceed a maximum transmit power.

15. The method of claim 11, wherein the instructing the wireless device to increase the first transmit power level is based on a target multi-antenna mode associated with the first plurality of wireless devices.

* * * * *